I. B. DILLON.
SHEEP SCRATCH-BOX.
No. 169,681.　　　　　　　　　　Patented Nov. 9, 1875.
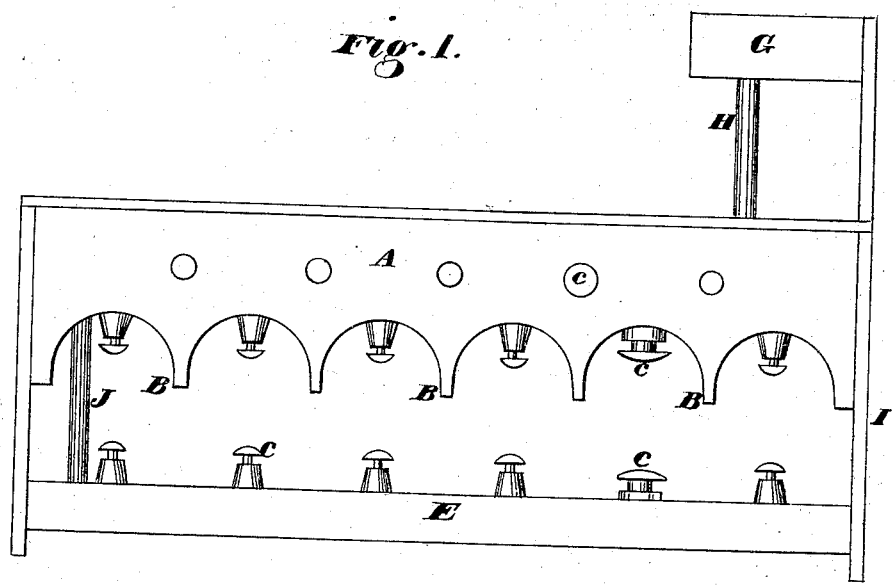
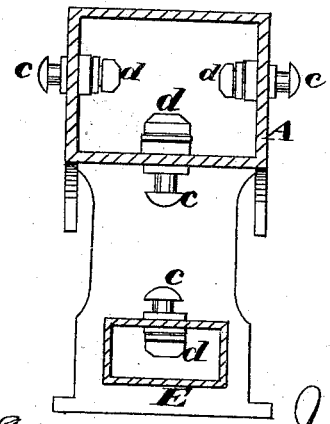
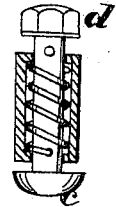
Witnesses
Geo. H. Strong
Jno. L. Boone
Inventor
Ira B Dillon
by Dewey & Co
Attys

UNITED STATES PATENT OFFICE.

IRA B. DILLON, OF VISALIA, CALIFORNIA.

IMPROVEMENT IN SHEEP-SCRATCH BOXES.

Specification forming part of Letters Patent No. 169,681, dated November 9, 1875; application filed May 3, 1875.

CASE B.

*To all whom it may concern:*

Be it known that I, IRA B. DILLON, of Visalia, Tulare county, State of California, have invented a Sheep-Scratch Box; and I do hereby declare the following description and accompanying drawings are sufficient to enable any person skilled in the art or science to which it most nearly appertains to make and use my said invention without further invention or experiment.

My invention relates to a device for automatically applying healing-ointment to the bodies of sheep or other animals which may be afflicted with a disease which can be cured by external applications.

This invention is an improvement upon a similar device for which Letters Patent were issued to me January 26, 1875; and it consists in the use of tight boxes, one of which may be placed above the other. Each of these boxes is connected with a supply-tank containing the healing-liquid, and situated sufficiently high to give a pressure. Suitable valves are placed in the bottom of the upper box, in the top of the lower one, and in the sides of one of them, so that the animals can rub freely against them, and in so doing allow the liquid to flow out upon their bodies wherever the sore spots may be, whether upon the back, sides, or belly.

Referring to the accompanying drawing for a more complete explanation of my invention, Figure 1 is a side elevation of my device. Fig. 2 is a transverse section. Fig. 3 is an enlarged section of one of the valves.

A is a containing-box, made, preferably, of considerable length, and with a tight top and bottom. Along its lower side are made a number of projecting points, B, extending downward, so as to provide a number of spaces between them and beneath the box. The box is placed at such a height that the sheep can readily pass beneath it in the spaces above mentioned, and valves are fitted to its bottom above each of the spaces, so that when the sheep pass through for the purpose of scratching they will open the valves and allow the liquid to flow out.

The valves $c$ may be made of any suitable shape and size; but I prefer to make each one in the form of a small tube closed at the upper end, and having a rounded knob at the end which projects through the bottom of the box, the hole extending down through this.

A nut or head, $d$, is fixed to the upper end, and a leather or other washer beneath this nut fits down tight upon the opening through which the stem or tube $c$ passes.

The opening may be large enough to allow the liquid to flow down upon each side of the stem, if this be solid; but I prefer to use a hollow tube, and perforate it just beneath the washer, so that when this is raised the liquid will flow into the tube, and out at the bottom.

A spring serves to keep the valve closed with sufficient force to prevent leakage.

In order to apply the remedy to the sides of the animal a number of the valves may be fixed, so that they will open in a horizontal direction when the sheep come up and rub their sides against them.

In order to apply the liquid to the belly and lower portions of the body, I form a tight box, E, which may be placed by itself, but will be found more convenient if placed in the same frame, and just beneath the box A, at such a height that, when the sheep are scratching themselves beneath the box A, their bellies will rub upon the top of the box E, the points B simply serving to keep the sheep in line with the valve. Valves similar to those in the upper box are fitted into the top of this lower one, so as to open upward, and by these devices it will be seen that an application can be made automatically to any or all parts of the sheeps' bodies from their habit of scratching the affected parts.

In order to supply the different boxes with the liquid under a sufficient pressure, I place a receiving tank, G, at some height above the upper box, and a pipe, H, carries the liquid to this box as fast as it may be needed.

The supporting-post I for this tank and the boxes A and E may be hollow, and the liquid may flow down this, and openings at the proper points will allow it to flow into the boxes; or, if preferred, separate pipes can be used, as at J. The device operates automatically, needing no attention, except to keep the tank supplied.

Having thus described my invention, what I claim, and desire to secure by Letters Patent, is—

1. In a device for automatically treating sheep, the tank G, elevated as shown, for the purpose of supplying a liquid to the boxes A and E under pressure, substantially as and for the purpose herein described.

2. In combination with the box A, the valves c, having the heads d fitting closely over the openings through which the stems pass, said stems being hollow, and having perforations just beneath the head to admit the liquid to the interior when the valve is raised, substantially as herein described.

IRA BENTON DILLON.

Witnesses:
  ISAAC GOLDSTEIN,
  P. S. TRACY.